(12) United States Patent
Zhou

(10) Patent No.: US 6,740,615 B2
(45) Date of Patent: May 25, 2004

(54) REGENERATION OF USED SUPPORTED NOBLE METAL CATALYSTS

(75) Inventor: Bing Zhou, Cranbury, NJ (US)

(73) Assignee: Hydrocarbon Technologies, Inc., Lawrenceville, NJ (US)

( * ) Notice: Subject to any disclaimer, the term of this patent is extended or adjusted under 35 U.S.C. 154(b) by 93 days.

(21) Appl. No.: 09/745,510

(22) Filed: Dec. 22, 2000

(65) Prior Publication Data

US 2002/0115554 A1 Aug. 22, 2002

(51) Int. Cl.[7] .................... B01J 20/34; B01J 38/50; B01J 38/62; B01J 38/56; B01J 23/40

(52) U.S. Cl. ................... 502/29; 502/28; 502/31; 502/261; 502/262; 502/263; 502/327; 502/332; 502/333; 502/334; 502/339; 502/355; 502/415; 502/439

(58) Field of Search ................... 502/28, 29, 31, 502/327, 332, 333, 334, 339, 355, 415, 439, 261, 262, 263

(56) References Cited

U.S. PATENT DOCUMENTS

| | | | |
|---|---|---|---|
| 3,674,706 A | * 7/1972 | Box, Jr. et al. | 252/412 |
| 4,148,750 A | 4/1979 | Pine | 252/416 |
| 4,454,240 A | 6/1984 | Ganguli | 502/26 |
| 4,595,666 A | 6/1986 | Ganguli | 502/26 |
| 4,983,558 A | * 1/1991 | Born et al. | 502/31 |
| 4,999,326 A | * 3/1991 | Sikkenga et al. | 502/30 |
| 5,017,535 A | * 5/1991 | Schoonhoven et al. | 502/30 |
| 5,188,996 A | 2/1993 | Huang et al. | 502/37 |
| 5,851,948 A | * 12/1998 | Chuang et al. | 502/314 |
| 6,001,762 A | * 12/1999 | Harmer et al. | 502/12 |
| 6,168,775 B1 | * 1/2001 | Zhou et al. | 423/584 |
| 6,239,054 B1 | * 5/2001 | Shukis et al. | 502/29 |

* cited by examiner

Primary Examiner—Cam N. Nguyen
(74) Attorney, Agent, or Firm—Workman Nydegger

(57) ABSTRACT

A method for regenerating used supported noble metal catalysts, which method includes solvent cleaning the used catalyst by contact with a suitable organic liquid cleaning solvent such as alcohols, ketones and such to remove organic deposits from the catalyst, followed by drying and calcining at elevated temperature to remove any remaining organic deposits from the catalyst, then treating the catalyst with an organo-metallic complex forming agent having ionization constant $pK_1$ greater than about 2.5, such as glycolic acid and the like. The organic-metallic complex forming agent acts to break down large clusters of noble metal particles such as palladium (Pd) and redistributes the metal particles on the catalyst support such as alumina ($Al_2O_3$) in the same or other larger pores, so as to increase catalyst surface area and catalytic activity to provide a catalytic activity level at least 80% or even exceeding that of the fresh catalyst. This regeneration method is particularly useful for regenerating used supported palladium catalysts utilized for hydrogenation of ethyl anthraquinone (EAQ) for producing hydrogen peroxide ($H_2O_2$) product.

36 Claims, 1 Drawing Sheet

FRESH CATALYST

FRESH CATALYST

SPENT CATALYST

CATALYST AFTER BURNOUT AT 850°F

REGENERATED CATALYST

LEGEND:
ooooo Pd PARTICLES
⌐⌐⌐⌐ ORGANIC DEPOSITS

SCHEMATIC PRESENTATION OF CATALYST SURFACES

REGENERATION OF USED SUPPORTED NOBLE METAL CATALYSTS

BACKGROUND OF INVENTION

This invention pertains to regeneration of used supported noble metal catalysts. It pertains particularly to regenerating used supported noble metal catalysts such as palladium catalysts utilized for hydrogenation of ethyl anthraquinone (EAQ) for producing hydrogen peroxide ($H_2O_2$) product, so as to achieve regenerated catalyst activity levels near or exceeding that of the fresh catalyst.

The conventional production of hydrogen peroxide product involves a two-step process in which a hydrogen donor solvent ethyl anthraquinone (EAQ) is first hydrogenated and then oxidized with oxygen to form the hydrogen peroxide product. In some hydrogen peroxide manufacturing facilities, the hydrogenation step is carried out in a fixed bed reactor utilizing a palladium/alumina or similar catalyst. A typical such catalyst may contain 0.28 to 0.33 wt % palladium on a large pore alumina support. The useful life expectancy of the catalyst is about two years, after which its activity drops to about 30% of its original (fresh catalyst activity) condition or level. It is believed that this catalyst deactivation is caused by deposition of high molecular weight organic materials formed from the polymerization of EAQ on the active sites of the catalyst, and/or by gradual agglomeration of the palladium to larger particles or clusters on the catalyst. Such used or spent palladium/alumina catalysts are presently being regenerated using a simple "wash-burn" procedure, in which the catalyst is first extracted with an organic solvent to remove any soluble material deposits, and then subjected to a controlled carbon burn-out step at about 850° F. temperature in air. Such used or high temperature regeneration treatment may also promote undesirable agglomeration of the palladium to larger particles on the catalyst support. Thus, it is difficult to successfully regenerate the used catalyst back to near 100% of its original activity. In fact, this simple wash-burn procedure can usually restore the used catalyst to only about 70% of its original or fresh activity level. Such "wash-burn" catalyst regeneration procedures have been disclosed by various U.S. and foreign patents. For example, U.S. Pat. No. 4,148,750 to Pine discloses a process for redispersal of noble metals on used supported zeolite-containing catalysts. U.S. Pat. Nos. 4,454,240 and 4,595,666 to Ganguli disclose method steps for regenerating used catalysts by dilute acid treatment to remove undesired metal deposits followed by carbon burn-off at increased temperature levels. Also, U.S. Pat. No. 5,188,996 to Huang et al discloses redispersion of noble metal such as platinum on low acidity support such as silica by contacting with chlorine and oxygen at low pressures.

It is desired to improve economics of the hydrogen peroxide production process by increasing the activity and service life of the palladium/alumina catalyst, as well as that of other similar supported noble metal catalysts. Based on an understanding at molecular level of the apparent catalyst reaction and deactivation mechanism, the surface structure of the catalyst support material, and the exposition of palladium crystal clusters thereon, an effective procedure has been developed for regenerating and enhancing used palladium/alumina catalyst to an activity level significantly higher (90% or more of fresh catalyst activity) than that achieved by the current "wash-burn" procedure.

SUMMARY OF INVENTION

This invention provides a regeneration method and procedure for regenerating and enhancing used supported noble metal catalysts. For the fresh catalyst, the support material such as alumina (AA) or silica (AN) having an initial surface area of 20–600 $m^2$/gm, surface area and 100–400 Angstroms pore diameter being preferred. The noble metals provided on and in pores of the support include palladium (Pd), platinum (Pt), gold (Au), iridium (Ir), osmium (Os) rhodium (Rh), or ruthenium (Ru), or combinations thereof, with palladium usually being preferred. The invention is particularly useful for regenerating and enhancing used supported palladium (Pd) catalyst, such as utilized for hydrogenation of ethyl-anthraquinone (EAQ) for producing hydrogen peroxide ($H_2O_2$) product.

The used catalyst regeneration method of this invention includes the following three basic steps:

(1) Cleaning the used supported noble metal catalyst by solvent extraction for removal of process contaminants and adsorbed chemicals from the used catalyst by contact with suitable organic solvent(s);

(2) Drying and calcining the cleaned used catalyst to remove any process contaminants or polymer deposits; remaining on the catalyst after the solvent extraction;

(3) Contacting the cleaned and calcined catalyst with a suitable organic treating agent selected for forming an organo-metallic complex for breaking down large noble metal agglomerates or clusters on the used catalyst to smaller metal particles, and redistributing the smaller noble metal(s) particles on or within the pores of the catalyst support. Suitable catalyst treating agents should have an ionization constant $pK_1$ greater than about 2.5.

The organic solvents suitable for the used catalyst cleaning method step (1) by solvent extraction of the used supported noble metal catalyst can be alcohols such as methanol, amines, ketones, or similar organic compounds utilized at cleaning conditions of 0–200° C. temperature and 1–50 atm. pressure for 2–8 hours contact time. Preferred solvent cleaning conditions are 10–100° C. temperature and 1–20 atm. pressure for 4–6 hours contact time. Suitable catalyst drying and calcining conditions for the method step (2) are heating the catalyst in air at 100–120° C. for 1–8 hours for the drying step, then further heating the dried catalyst in air at 200–600° C. (392–1112° F.) temperature for 1–24 hours for the calcining step. Preferred calcining conditions are 250–500° C. temperature and ambient pressure for 2–10 hours duration, Calcining the dried catalyst at lower temperatures and longer time periods within these ranges is usually preferred for economic reasons.

The organo-metallic complex forming chemical treating agents suitable for the noble metal redistribution method step (3) on the cleaned noble metal catalysts are chemical compounds having carbon atoms not exceeding about 20 and molecular weight not exceeding about 300. The treating agent should also have an ionization constant $pK_1$ greater than about 2.5, as defined by the following equation and its transformation:

$$RCOOH + H_2O \leftrightharpoons RCOO^- + H_3O^+$$

$$K_1 = \frac{[RCOO^-][H_3O^+]}{[RCOOH]}$$

Some examples of organo-metallic complex forming chemical treating agents and their corresponding ionization constants $pK_1$ are as follows:

| Treating Agent | $pK_i$ |
| --- | --- |
| Oxalic Acid | 1.27 |
| EDTA | 2.01 |
| Citric Acid | 3.13 |
| Glycolic Acid | 3.63 |
| Succinic Acid | 4.21 |
| Glycine | 9.78 |
| Salicylic Acid | 13.12 |

Oxalic acid having $pK_1$ of 1.27 and ethylene diaminetetraacetic acid (EDTA) having $pK_1$ of 2.01 are outside this desired range, and are thereby not suitable for providing desired organo-metallic complexes for this invention. Also, EDTA has been shown to remove aluminum from zeolites by a chelation effect which can thereby render zeolite supports ineffective by deactivating the support. Useful reaction conditions for forming the organo-metallic complexes and for redistributing the noble metal particles from the clusters on the catalyst support by the treating agent(s) are 10–500° C. temperature and 1–10 atm. pressure for 1–8 hours duration, with 20–450° C. temperature and 1–5 atm. pressure for 2–6 hours duration being preferred. For best results, the organic treating agent should preferably be maintained in its liquid phase, however a liquid/vapor phase mixture having only a small portion of vapor may be utilized.

By utilizing the used catalyst regeneration method and procedure according to this invention, it is proved experimentally that used palladium (Pd) catalyst supported on alumina can be better cleaned for removal of the process contaminants and polymer deposits, and thus expose more catalyst surface and active Pd sites to a process reactant. Catalyst activity tests have also shown that used supported Pd catalysts regenerated by the method of this invention have their activity significantly increased to at least about 80% and preferably up to 93%–103% of fresh catalyst activity level, compared to only about 70% of fresh catalyst activity after being regenerated by known traditional "washburn" regeneration procedures. This regeneration method is particularly useful for used supported catalysts containing 0.2–0.4 wt. % palladium deposited on a support of alumina or silica, as utilized for producing hydrogen peroxide ($H_2O_2$) by hydrogenation of ethyl-anthraquinone (EAQ).

Advantages provided by the catalyst regeneration method and procedure of this invention include its ability to not only effectively remove contaminants and organic deposits from the used noble metal catalyst, but also to break apart and redistribute the active noble metal molecules such as palladium in the pores of the catalyst support. This new catalyst regeneration method and procedure not only cleans the contaminated catalyst surface, but also improves the exposition and distribution of the noble metal(s) such as palladium on the catalyst support. The regeneration procedure can restore catalyst activity to 100% or more of the fresh catalyst standard, and the resulting molar selectivity ratio of desired product to side products is 190:1, which is a better molar selectivity ratio than that achieved for fresh catalyst (150:1). This catalyst regeneration procedure and method is considered useful for regenerating supported noble metal catalysts containing other noble metals instead or in addition to palladium. After such used catalyst regeneration, the process reactant(s) have improved contact with the catalyst active metal(s) particles and thereby enhance the activity and product selectivity of the catalyst.

DESCRIPTION OF INVENTION

Figure 1A:
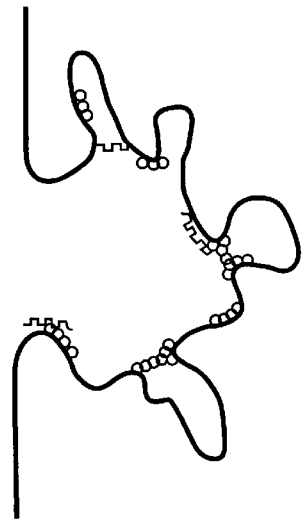
FIGS. 1(a)–1(d) show schematic illustrations of typical deposition of noble metal(s) such as palladium in the pores of the support for fresh, spent and regenerated supported palladium catalysts, respectively.
Figure 1B:
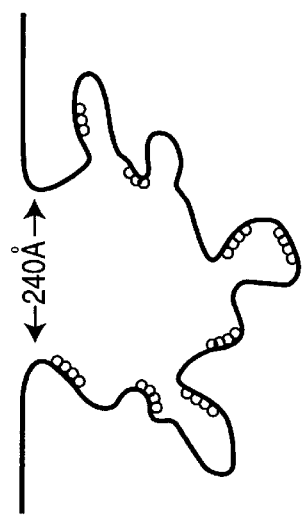

The catalyst overall regeneration method and procedure developed for the used supported noble metal catalysts, such as palladium (Pd) catalyst on alumina support, includes the following specific steps:

1. Cleaning the used supported Pd catalyst having process contaminants such as organic deposits by contact with a selected liquid cleaning solvent such as methanol at 0–200° C. temperature and 1–50 atm. pressure to dissolve and substantially remove the organic deposits from the catalyst.
2. Drying the used catalyst at 100–120° C. temperature for 1–8 hours to remove the cleaning solvent from the catalyst
3. Calcining the cleaned catalyst in air at 200–600° C. temperature for 1–24 hours to remove any remaining organic deposits from the catalyst.
4. Adsorbing a suitable organic treating agent selected for forming an organo-metallic complex on the catalyst, and breaking down relatively large Pd particle clusters and relocating or redistributing the resulting smaller palladium particles in pores of the support material by contact with the organo-metallic complex forming agent liquid and vapor, such as glycolic acid having ionization constant $pK_1$ of 3.63. Suitable treating agent contacting conditions on the dried and calcined catalyst are 10–500° C. temperature and 1–10 atm. pressure for 2–8 hours contact time.

When utilizing the supported palladium on alumina catalyst for producing hydrogen peroxide product from ethyl anthraquinone (EAQ), the critical diameter of intermediate EAQ:$H_2$ dimer molecules is about 120 Å. Therefore, the ideal pore diameter of the alumina support should be at least about 1.5 and preferably about 2.0 times that of the dimer molecules, i.e. at least about 180 Å and preferably at least 240 Å, so as to allow free movement of the reactant dimer from the adsorbed site on the catalyst. During the used catalyst regeneration, it is desirable to break up Pd particle clusters from pores having diameter smaller than about 180 Å, and relocate the resulting smaller palladium particles into pores having diameters larger than about 180 Å. It is also desirable to avoid depositing the Pd particles into the catalyst pores having a size smaller than about 180 Å. Thus, for this used palladium catalyst regeneration method, it is desirable to relocate the Pd particles from the pores smaller than about 180 Å into those pores larger than 180 Å, and preferably larger than 240Å.

The four main reasons for the used supported Pd catalyst deactivation during hydrogenation of ethyl anthraquinone (EAQ) to produce hydrogen peroxide are: (1) contamination of the Pd catalyst by poisoning chemicals in the process feed or solvent; (2) coke deposition or large polymer molecule formation blocking the active Pd sites; (3) Pd particles agglomeration to form clusters; and (4) Pd leaching from the catalyst. The first three reasons for catalyst deactivation are at least partially reversible by regeneration, but the Pd loss by leaching is irreversible. After the palladium is lost from the catalyst, it is not possible to restore the catalytic activity to near its initial or original level.

Experimental data have indicated some catalyst deactivation due to the first three listed reasons. Theoretical understandings of the reaction mechanism, catalyst structure and deactivation provide the basis for designing this improved catalyst regeneration method and procedure for used or spent supported noble metal catalysts, such as supported palladium catalysts. In order to regenerate the spent catalyst to a highly active and product selective state, the regeneration method must achieve the following critical requirements:

1) solvent clean the used Pd catalyst surface to substantially remove its contaminants and organic deposits,
2) breakdown the large Pd particles clusters on the catalyst to smaller particles, and
3) relocate the smaller Pd particles from small pores to those having a diameter larger than about 180Å.

Experimental results have shown that the first two goals were achieved, and it is believed that the third goal also was achieved, as the regenerated catalyst activity and selectivity results indicate that the Pd was redistributed or relocated to a desirable state on the catalyst support. In fact, when a suitable organo-metallic complex forming and redistributing agent such as glycolic acid is utilized, the following effects on the Pd particles are believed to occur: (1) The reaction between Pd clusters and glycolic acid treating agent breaks down the large Pd clusters to the smaller clusters and particles. (2) The glycolic acid agent helps to intercalate in between the Pd particles, thus allowing a more even distribution of these metal particles on the support. (3) The glycolic acid treating agent can also enter the pores smaller than 180 Å and react with Pd. When more Pd-glycolate complexes are formed, the pores are too small to hold all the complexes, and the Pd-glycolate material is sequentially squeezed out of pores smaller than 180 Å. After these Pd glycolates move into the larger pores, several Pd-glycolates will combine together by hydrogen bonding to form a large Pd-glycolate cluster, and this effect will prevent the Pd from depositing into the pores smaller than 180Å.

The surface of typical fresh and used or spent supported palladium (Pd) catalysts, and catalyst regenerated according to this invention, are shown schematically in FIGS. 1(a)–1(d). As seen in FIG. 1(a), the surface of fresh catalyst is clean, and the Pd particles are deposited randomly in both small and large pores due to the catalyst traditional non-particle-size control preparation procedure. For the used or spent supported noble metal catalyst (FIG. 1b), due to the long term exposition of catalyst under the reaction conditions the Pd particles have agglomerated to form larger clusters, thereby at least partially blocking the catalyst small pores. The organic deposits are also formed on the Pd surface and alumina support, and can block more small pores. These effects result in a significant decrease of catalyst activity, surface area, and percentage of pores smaller than about 200 Å exposition.

Figure 1C:
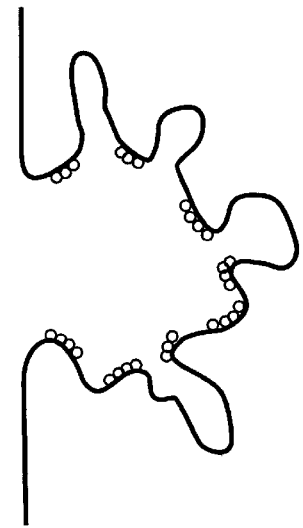
Figure 1D:
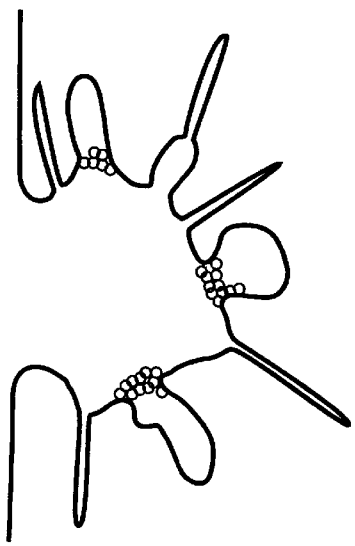

Traditional catalyst regeneration methods by heating to about 450° C. (842° F.) temperature for several hours can clean the catalyst surface (FIG. 1c). However, the sintering of Pd during such catalyst heating forms larger particles which block the entrance of many small pores of the support. The low surface exposition of large Pd particles results in limited access of reactants to the active Pd, thus leading to a less active catalyst than the fresh catalyst standard.

This invention will be further described by reference to the following example, which should not be construed as limiting the scope of the invention.

EXAMPLE

Samples of used supported palladium (Pd) on alumina catalyst, obtained from extended operations for hydrogenation of ethyl anthraquinone (EAQ) for producing hydrogen peroxide ($H_2O_2$) product, were regenerated utilizing the method of this invention. The used catalyst contained 0.2–0.4 wt. % palladium on alumina support. The used catalyst was first contacted with methanol solvent at 25° C. and ambient pressure for 3.3 hours, then replaced with new methanol solvent three times with each time for 30 minutes (0.5 hour). Then the washed catalyst was dried in air at 110° C. for 2 hours, then calcined in air at 400° C. for 4 hours. The calcined catalyst was then treated with glycolic acid agent at 400° C. and ambient pressure for 3 hours. The results obtained with the used catalyst that was regenerated by this procedure are shown in Table 1, and are depicted schematically in FIG. 1(d).

TABLE 1

Regeneration of Used Supported Palladium Catalyst

|  | Fresh | Used | Wash-Burn | Regenerated |
|---|---|---|---|---|
| Catalyst Surface Area, $m^2/g$ | 82.6 | 80 | 76.7 | 88.1 |
| Pores Diameter <240 Å, % |  | 9.5 |  | 13.0 |
| Desired Product/Side Product Molar Ratio | 150:1 |  |  | 190.5 |
| Catalyst Activity Relative to Fresh Catalyst, % | 100 | ~30 | 70 | 90–103 |

From the above results, it is noted that after the catalyst was cleaned by methanol solvent and regenerated by contact with glycolic acid treating agent, its surface area increased to 88.1 $m^2/g$, which is desirably greater than that of the fresh catalyst standard (82.6 $m^2/g$). The percentage of pores <240 Å also increased to 13.0% from 9.5% for the spent catalyst. These results indicate that the catalyst regeneration method of this invention not only cleans all the organic deposits from the used catalyst, but also clears the blockage of small pores in the support, which means that the large Pd particles on the used catalyst were broken down to smaller particles for the regenerated catalyst. Also, the increased surface area indicates that the Pd particle size is smaller than that of the fresh standard, and the particles are deposited mainly in the larger pores, otherwise the catalyst surface area would not increase significantly. This explanation is fully supported by the catalyst activity and selectivity test results.

Used catalyst regenerated by the method of the present invention has an activity close to or even exceeding 100% of the fresh catalyst standard. Because the spent catalyst had been used for years, some attrition and loss of Pd from the support is unavoidable, but this new catalyst regeneration procedure restored the activity to near 100% or more of the fresh standard activity. This result indicates that for the regenerated catalyst the Pd active metal is being used more efficiently, e.g. the Pd is exposed on the catalyst surface in smaller particle size and at locations which are easy for process reactants to reach, i.e in pores larger than about 240 Å diameter.

The molar ratio of desired $H_2O_2$ product to side product after the catalyst regeneration (190:1) also exceeded that for the fresh catalyst standard (150:1). The high selectivity is apparently an effect of Pd deposited in pores >240 Å. As discussed above, to avoid over hydrogenation of $EAQ:H_2$ dimer and formation of the undesired product $EAQ:H_4$, one must try to minimize the time during which $EAQ:H_2$ remains at the adsorbed site, and this intermediate material must be removed as soon as possible. The critical diameter of intermediate $EAQ:H_2$ dimer is about 120 Å. Ideally, it should be avoided to deposit Pd into the catalyst pores that have a diameter smaller than 240 Å, and in which the free movement of the dimer is restricted and excess hydrogenation is unavoidable.

Although this invention has been described broadly and also in terms of specific preferred embodiments, it will be understood that modifications and variations may be made to the invention as defined within the scope of the following claims.

I claim:

1. A method for regenerating used supported noble metal catalyst, comprising the steps of:
    (a) providing a used noble metal catalyst having process contaminant material deposits contained on the catalyst, said catalyst including a support having initial surface area of 20–600 m$^2$/g and containing palladium (Pd), platinum (Pt), gold (Au), iridium (Ir), osmium (Os), rhodium (Rh), ruthenium (Ru) or combinations thereof on the support; at least a portion of said noble metal comprising noble metal particle clusters on said support;
    (b) cleaning said used catalyst by contacting it with an suitable organic cleaning solvent at a temperature of 0–200° C. and a pressure of 1–50 atm for sufficient contact time to substantially dissolve process contaminant material deposits from the catalyst;
    (c) drying said used cleaned catalyst and removing the organic cleaning solvent to provide a dried catalyst;
    (d) calcining said dried catalyst at a temperature of 200–600° C. for 1–24 hours duration and removing any remaining contaminant material deposits; and
    (e) adsorbing on said dried and calcined catalyst an organo-metallic complex forming agent while breaking down said noble metal particle clusters and relocating the resulting smaller metal particles on the support by contacting said catalyst with the organo-metallic complex forming agent at a temperature of 10–500° C. and a pressure of 1–10 atm, and thereby regenerating the catalyst activity level to at least 80% of its fresh catalyst activity, said agent having up to 20 carbon atoms, molecular weight not exceeding 300, and having an ionization constant pK$_1$ exceeding about 2.5.

2. The method for regenerating the catalyst according to claim 1, wherein said used catalyst contains 0.2–0.4 wt. % palladium (Pd) on alumina support, said support having pore diameter range of 50–600 Angstroms.

3. The method for regenerating the catalyst according to claim 2, wherein the regenerated catalyst activity is restored to 90–103% of fresh catalyst activity.

4. The method for regenerating the catalyst according to claim 2, including utilizing the regenerated supported palladium (Pd) catalyst for hydrogenation of ethyl anthraquinone (EAQ) for producing hydrogen peroxide (H$_2$O$_2$) product.

5. The method for regenerating the catalyst according to claim 1, wherein said organic cleaning solvent is liquid methanol and said catalyst is contacted at a temperature of 10–100° C. and a pressure of 1–20 atm. for 2–8 hours.

6. The method for regenerating the catalyst according to claim 1, wherein the catalyst drying step occurs by heating the cleaned catalyst in air at a temperature of 100–120° C. for 1–8 hours duration.

7. The method for regenerating the catalyst according to claim 1, wherein the catalyst calcining step occurs in air at a temperature of 250–500° C. (482–932° F.) and ambient pressure for 2–10 hours duration.

8. The method for regenerating the catalyst according to claim 1, wherein the organo-metallic complex forming agent is glycolic acid and said catalyst is contacted at a temperature of 20–450° C. and a pressure of 1–5 atm. for 1–8 hours.

9. A method for regenerating used supported palladium catalyst, comprising the steps of:
    (a) providing a used palladium (Pd) catalyst on alumina support having organic material deposits on the catalyst, said catalyst having initial surface area of 50–500 m$^2$/g and said palladium comprising particle clusters on the alumina support;
    (b) cleaning said used supported palladium (Pd) catalyst by contacting it with liquid methanol cleaning solvent at a temperature of 10–100° C. and a pressure of 1–20 atm. for 2–8 hours and dissolving the organic material deposits from the catalyst;
    (c) drying said used cleaned catalyst at a temperature of 100–120° C. for 1–8 hours and removing said liquid methanol cleaning solvent to provide a dried catalyst; and
    (d) calcining said dried catalyst in air at a temperature of 350–500° C. for 2–10 hours duration and removing any remaining organic material deposits from the catalyst; and
    (e) adsorbing glycolic acid treating agent on said dried and calcined catalyst while breaking down said palladium particle clusters and relocating the palladium particles on the catalyst support by action of the glycolic acid treating agent utilized at a temperature of 20–450° C. and a pressure of 1–5 atm. for 1–8 hours contact time, and thereby regenerating the catalyst activity level to 90–103% of fresh catalyst activity.

10. The method for regenerating the catalyst according to claim 9, including utilizing the regenerated supported palladium (Pd) catalyst for hydrogenation of ethyl anthraquinone (EAQ) for producing hydrogen peroxide (H$_2$O$_2$) product.

11. A method for regenerating a used noble metal catalyst, comprising:
    (a) providing a used noble metal catalyst comprising a support and at least one noble metal comprising noble metal particle clusters attached to the support;
    (b) contacting the used noble metal catalyst with an organo-metallic complex forming agent having an ionization constant pK$_1$ of at least about 2.5; and
    (c) breaking down the noble metal particle clusters and relocating the at least one noble metal as smaller noble metal particles on the support to yield a regenerated noble metal catalyst.

12. The method for regenerating a used noble metal catalyst as defined in claim 11, wherein the support of the used noble metal catalyst in (a) has an initial surface area of 20–600 m$^2$/g and pore diameters in a range of 50–600 Angstroms.

13. The method for regenerating a used noble metal catalyst as defined in claim 11, wherein the support of the used noble metal catalyst in (a) has an initial surface area of 50–500 m$^2$/g and pore diameters in a range of 100–400 Angstroms.

14. The method for regenerating a used noble metal catalyst as defined in claim 11, wherein the support comprises alumina or silica.

15. The method for regenerating a used noble metal catalyst as defined in claim 11, wherein the noble metal comprises at least one of palladium (Pd), platinum (Pt), gold (Au), iridium (Ir), osmium (Os), rhodium (Rh), or ruthenium (Ru).

16. The method for regenerating a used noble metal catalyst as defined in claim 11, wherein at least a portion of the noble metal particle clusters in (a) are located in pores in the support.

17. The method for regenerating a used noble metal catalyst as defined in claim 16, wherein at least a portion of the noble metal particle clusters in (a) are located in pores having a diameter smaller than about 180 Angstroms.

18. The method for regenerating a used noble metal catalyst as defined in claim 17, wherein (c) results in at least a portion of the smaller noble metal particles being relocated into pores having a diameter greater than about 180 Angstroms.

19. The method for regenerating a used noble metal catalyst as defined in claim 17, wherein (c) results in at least a portion of the smaller noble metal particles being relocated into pores having a diameter greater than about 240 Angstroms.

20. The method for regenerating a used noble metal catalyst as defined in claim 11, wherein the organo-metallic complex forming agent of (b) comprises up to 20 carbon atoms and has a molecular weight of up to 300.

21. The method for regenerating a used noble metal catalyst as defined in claim 11, wherein the organo-metallic complex forming agent comprises at least one of citric acid, succinic acid, glycine or salicylic acid.

22. The method for regenerating a used noble metal catalyst as defined in claim 11, wherein the organo-metallic complex forming agent comprises glycolic acid.

23. The method for regenerating a used noble metal catalyst as defined in claim 11, wherein (c) is performed at a temperature of 10–500° C. and a pressure of 1–10 atm for 1–8 hours.

24. The method for regenerating a used noble metal catalyst as defined in claim 11, wherein (c) is performed at a temperature of 20–450° C. and a pressure of 1–5 atm for 2–6 hours.

25. The method for regenerating a used noble metal catalyst as defined in claim 11, wherein (c) is performed while maintaining the organo-metallic complex forming agent in a liquid phase.

26. The method for regenerating a used noble metal catalyst as defined in claim 11, wherein (c) is performed while maintaining the organo-metallic complex forming agent in a liquid/vapor phase.

27. The method for regenerating a used noble metal catalyst as defined in claim 11, further comprising cleaning the used noble metal catalyst of (a) by contacting it with an organic cleaning solvent for sufficient contact time to substantially dissolve contaminants attached thereto to yield a cleaned noble metal catalyst.

28. The method for regenerating a used noble metal catalyst as defined in claim 27, wherein the used noble metal catalyst is contacted with the organic cleaning solvent at a temperature of 0–200° C. and a pressure of 1–50 atm.

29. The method for regenerating a used noble metal catalyst as defined in claim 27, further comprising drying the cleaned noble metal catalyst to remove the organic cleaning solvent and yield a dried noble metal catalyst.

30. The method for regenerating a used noble metal catalyst as defined in claim 29, wherein the cleaned noble metal catalyst is dried at a temperature of 100–120° C. for 1–8 hours.

31. The method for regenerating a used noble metal catalyst as defined in claim 29, further comprising calcining the dried noble metal catalyst to remove any organic deposits therefrom.

32. The method for regenerating a used noble metal catalyst as defined in claim 31, wherein the dried noble metal catalyst is calcined in air at a temperature of 200–600° C. for 1–24 hours.

33. The method for regenerating a used noble metal catalyst as defined in claim 11, wherein the method results in a regenerated catalyst obtained in (c) has at least 80% of its original catalyst activity.

34. The method for regenerating a used noble metal catalyst as defined in claim 11, wherein the method results in a regenerated catalyst obtained in (c) has at least 90% of its original catalyst activity.

35. The method for regenerating a used noble metal catalyst as defined in claim 11, wherein the method results in a regenerated catalyst obtained in (c) has more than 100% of its original catalyst activity.

36. A regenerated noble metal catalyst prepared by the method according to anyone of claims 11–35.

* * * * *

UNITED STATES PATENT AND TRADEMARK OFFICE
CERTIFICATE OF CORRECTION

PATENT NO. : 6,740,615 B2
APPLICATION NO. : 09/745510
DATED : May 25, 2004
INVENTOR(S) : Bing Zhou It is certified that error appears in the above-identified patent and that said Letters Patent is hereby corrected as shown below:

Column 2
Line 3, after "20-600m$^2$/gm" delete "," and insert --and pore diameters within the rangeof 50-600 Angstroms, with 50-500m$^2$/gm--
Line 47, after "duration" change "," to --.--
Line 64, please insert --$K_1$ should be less than 1 x 10$^{-2.5}$, and p$K_1$ should be greater than 2.5--

Column 4
Line 17, after "catalyst" insert --.--
Line 32, after "2-8 hours" remove [contact time]
Line 34, before "for producing" insert --contact time--

Column 7
Line 19, before "organic" remove [suitable]

Signed and Sealed this

Twenty-first Day of November, 2006

JON W. DUDAS
*Director of the United States Patent and Trademark Office*